United States Patent

Irace

[11] Patent Number: 6,099,095
[45] Date of Patent: Aug. 8, 2000

[54] INTERLOCKING CABINET SYSTEM

[76] Inventor: Francisco D. Irace, 6225 SW. Kendale Lake Cir. No. D-152, Miami, Fla. 33183-0000

[21] Appl. No.: 09/205,991

[22] Filed: Dec. 4, 1998

[51] Int. Cl.$^7$ .................................................. A47B 43/00
[52] U.S. Cl. .................. 312/257.1; 220/4.01; 312/265.5; 312/108
[58] Field of Search ...................... 312/108, 264, 312/257.1, 265.5, 265.6; 220/4.01, 4.02

[56] References Cited

U.S. PATENT DOCUMENTS

| | | | |
|---|---|---|---|
| 3,497,279 | 2/1970 | Chovanec | 312/257.1 X |
| 4,171,150 | 10/1979 | Soderlund | 312/265.5 X |
| 4,782,972 | 11/1988 | Wenkman et al. | 312/264 X |
| 4,836,626 | 6/1989 | Taylor et al. | 312/257.1 |
| 5,360,263 | 11/1994 | Nakano et al. | 312/257.1 |
| 5,593,219 | 1/1997 | Ho | 312/265.5 X |
| 5,845,977 | 12/1998 | Neukam et al. | 312/108 X |
| 5,944,398 | 8/1999 | Wu | 312/223.2 |

Primary Examiner—Peter M. Cuomo
Assistant Examiner—Stephen Vu
Attorney, Agent, or Firm—J. Sanchelima

[57] ABSTRACT

A system for building metal cabinets with two first frame members each having a substantially rectangular shape with four elongated members that include first and second set of openings on their ends that cooperatively receive bendable tabs on the edges of walls defining spacer members for the two top aligned corners of the frame members. A bottom wall acts as a spacer and it is mounted to the two lower corners of the frame members with bendable tabs. A cabinet compartment is thus defined and panels can then be added as its cover, bottom, back, closures, drawers, or shelves. No soldering is required making it very convenient for on site installation.

2 Claims, 3 Drawing Sheets

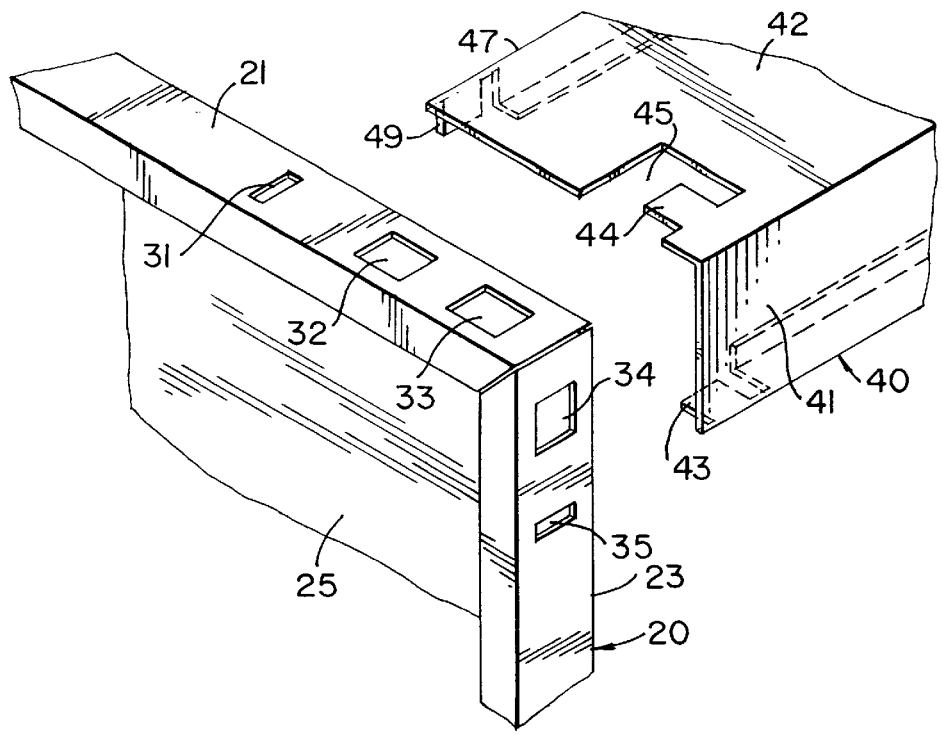
Fig_2_
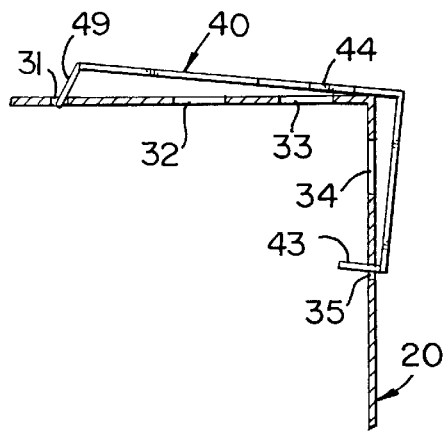
Fig_3_
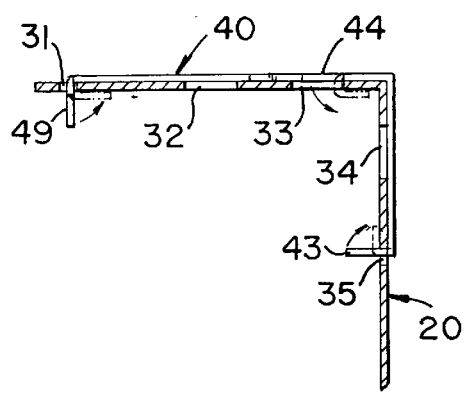
Fig_4_

INTERLOCKING CABINET SYSTEM

BACKGROUND OF THE INVENTION

1. Field of the Invention

The present invention relates to a cabinet system, and more particularly, to the type that does not require fastening members for its construction.

2. Description of the Related Art

Metallic cabinets have been design and built for many years. They require to be built off-site after taking the measurements of the installation site. The present invention obviates these shortcomings and permits a user to assemble standard panel members without requiring the use of fastening members. None of the metal cabinet systems found in the prior art have the features of the claimed invention.

SUMMARY OF THE INVENTION

It is one of the main objects of the present invention to provide a system for building metallic cabinets without using any fastening members.

It is another object of this invention to provide such a system for building the cabinets and the installation site.

It is still another object of the present invention to provide a system that reduces the manufacturing, inventory, storage and transportation logistics by using only two punching dice to manufacture the required standard panels.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 2 shows an inclined view of one of the corners of the invention showing the locking mechanism on each of the corners.

FIG. 3 shows a partial cross-sectional side elevational view of one of the corners of the present invention showing the manner in which it is aligned for installation.

FIG. 4 shows the corner shown in the previous figure with the locking mechanism in place.

DETAILED DESCRIPTION OF THE PREFERRED EMBODIMENT

Figure 1:
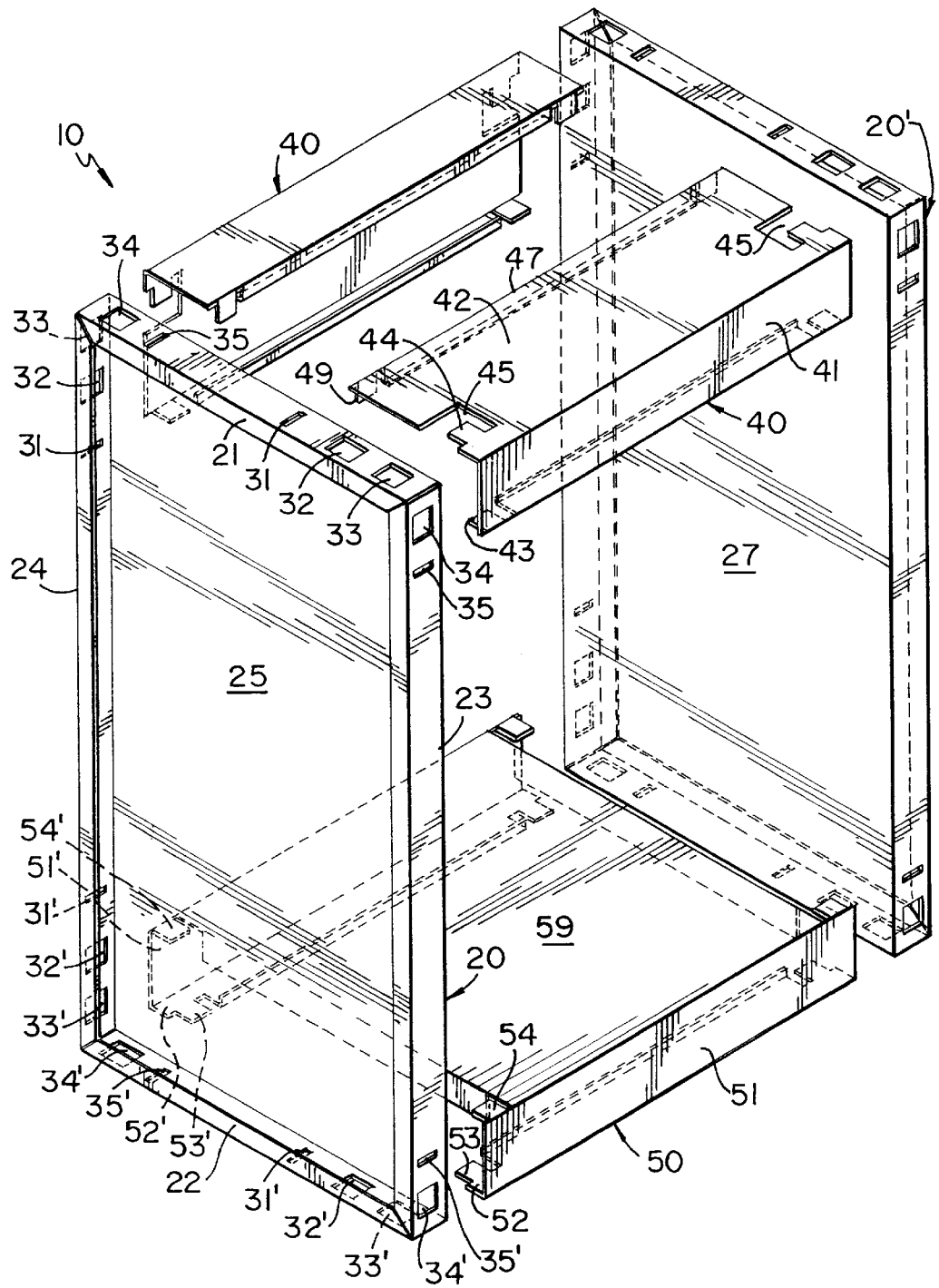
FIG. 1 is an isometric representation of one embodiment for the present invention.
Figure 5:
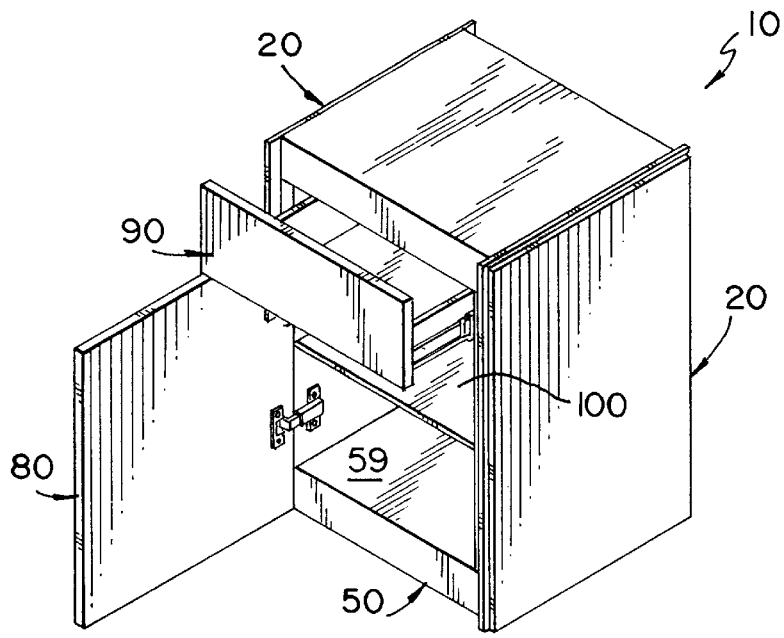
FIG. 5 is an isometric representation of one of the embodiments with a closure member hingedly mounted thereon and a shelf within the cabinet space.

Referring now to the drawings, where the present invention is generally referred to with numeral 10, it can be observed that it basically includes vertical frame members 20 and 20', two horizontal spacer members 40, and one spacer member 50 with bottom panel 59. Frame members 20 and 20' have a substantially rectangular shape and define the sides of the cabinet. To build a basic cabinet compartment, members 20 and 20' are held at a spaced apart and parallel relationship with respect to each other by two members 40, one for each of the top corners and one spacer member 50 in interlock engagement to form a cabinet compartment. Panels 25 and 27 have a rectangular shape and are mounted at a parallel and spaced apart relationship to each other to define the width of the cabinet. Front closure assembly 80 is optional. Another option is to have drawer 90 mounted within the cabinet compartment. Additionally or alternatively, shelf assemblies 100 can be removably mounted within the compartment.

Vertical frame members 20 (and 20') include, at each corner, locking mechanism 30 that includes openings 31; 32; 33; 34 and 35, as seen in FIGS. 1 and 2. Openings 31; 32 and 33 are positioned on one end of horizontal structural member 21 (and also horizontal structural member 22), and the other end includes openings 34 and 35. Vertical structural member 23 includes openings 34 and 35 at both ends. Vertical structural member 24 includes openings 31; 32 and 33 at both ends. Panels 25 and 27 are mounted to the internal sides of members 21; 22; 23 and 24.

Horizontal spacer members 40 include elongated walls 41 and 42, perpendicularly and longitudinally disposed with respect to each other and each having two ends. Wall 41 includes bendable tabs 43, at a predetermined and relatively small distance from the ends, that extend perpendicularly from the distal edge of wall 41 and parallel to wall 42. Walls 42 include, at each end, cutouts 45 positioned at a predetermined distance from the vertex or union of walls 41 and 42. Cut out 45 includes bendable tab 44, at a predetermined and relatively small distance from the end of wall 42. Edge 47 extends longitudinally beyond cutout 45. Tab 49 extends perpendicularly from edge 47.

The orientation of the openings 31 through 35 of locking mechanism 30 on each corner is such that they cooperate with tabs 43, 44, and 49 to lock members 40 to members 20. As seen in FIGS. 2; 3 and 4, locking mechanism 30 for the top corners of frame assembly 20 requires the insertion of tabs 43; 44 and 49 in openings 35; 33 and 31, respectively. First, tab 43 is inserted through opening 35, as shown in FIG. 3, and tab 49 is bent slightly outwardly to permit its insertion it through opening 31. Then, as seen in FIG. 4, all tabs are bent inwardly against the inner surface of the members comprising frame assembly 20.

Similarly, bottom spacer member 50 includes elongated walls 51 and 51' each one perpendicular to bottom 59 and joined at an elongated vertex or union. Walls 51 and 51' extend a predetermined distance beyond the width of bottom 59 where tabs 54 and 54' are formed, adjacent to the vertex and extending perpendicularly with respect to walls 51 and 51' respectively. Elongated walls 52 and 52' extend longitudinally and perpendicularly with respect to wall 51 and 51' and each one has a distal longitudinal edge with two ends. Each of these ends includes one tab 53 (or 53') that extends therefrom. Tabs 53 and 54 are cooperatively positioned to coincide with openings 33' and 35', as seen in FIGS. 1 and 6.

Figure 6:
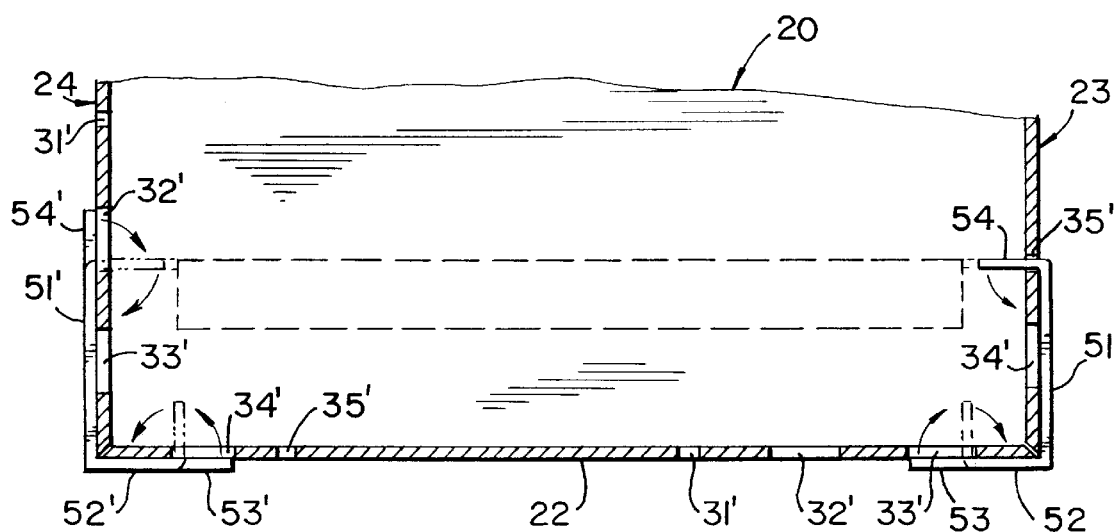
FIG. 6 is a partial cross-sectional side elevational view of the lower corners of the frame member engaged to the bottom spacer member.

With respect to tabs 53' and 54', it can be seen from FIG. 6 how they are installed. Tab 54' is straightened out so that wall 51' can be placed, at one end, next to the outer surface of member 24. Once it is positioned, tabs 53' and 54' are bent through openings 34' and 32', respectively.

The foregoing description conveys the best understanding of the objectives and advantages of the present invention.

Different embodiments may be made of the inventive concept of this invention. It is to be understood that all matter disclosed herein is to be interpreted merely as illustrative, and not in a limiting sense.

What is claimed is:

1. A system for building cabinets, comprising:

A) two frame members each having a substantially rectangular shape with first, second, third and fourth elongated members, each having two ends, defining first, second, third and fourth corners, with said first and second elongated members positioned opposite to each other and kept at a spaced apart and parallel relationship with respect to each other by said third and fourth elongated members that are also kept at a parallel and spaced apart relationship to each other, and said first and second elongated members being structurally similar and each having a first set of openings on one end and a second set of openings at the other end, said first set of openings including first and second rectangular openings located at predetermined first and second distances respectively from one of the ends of said first and second elongated members and a second set of openings including third, fourth, and fifth rectangular openings located at third, fourth, and fifth predetermined distances, respectively, from the other ends of said first and second elongated members and said first, third, and fourth rectangular openings having larger longitudinal dimensions along said first and second elongated members than said second and fifth rectangular openings; and said third elongated member having two ends, and the ends of said third elongated member including said first set of openings at each end, and said fourth elongated member having two ends and including said second set of openings at each end of said fourth elongated members;

B) first and second spacer members each having two ends, and each of said first and second spacer members including first and second elongated walls with two longitudinal edges, and said first and second elongated walls being mounted perpendicular to each other at one of their longitudinal edges, thereby defining a common longitudinal joint, said first elongated wall including bendable first tabs extending from the other longitudinal edge at a sixth predetermined distance from each of the ends of said first and second spacer members, and said second longitudinal wall including a rectangular cutout at each of its ends at a predetermined distance from said common longitudinal joint, and said cut out including a bendable second tab and the other longitudinal edge of said second elongated wall including a bendable third tab positioned at said sixth predetermined distance from the ends, so that said first tabs of said first spacer member are insertable through said second opening of said fourth elongated members defining said first corners and said second and third tabs are insertable through said third and fifth openings of said first elongated member and said first tabs of said second spacer member are insertable through said second opening of said first elongated member partially defining said second corner and said second and third tabs are insertable through said third and fifth openings, respectively, of said third elongated member partially defining said second corner;

C) a third spacer member having third and fourth elongated walls having two ends each, kept at a parallel and spaced apart relationship to each other and a bottom rectangular wall with first and second pairs of equal sides, and said first pair of sides being perpendicularly mounted to said third and fourth walls, each including two longitudinal edges that extend beyond said first pair of sides and said third elongated wall further includes bendable fourth tabs on both ends of said third and fourth elongated walls, said fourth tab being adjacent to said bottom wall and in a same plane extending from one of said longitudinal edges, and a fifth tab extending perpendicularly from the other longitudinal edges of said third and fourth walls, said bottom wall being mounted to one of the longitudinal edges of said third and fourth elongated walls so that said fourth tabs of said third elongated walls are inserted through said second openings of said fourth elongated member and said fifth tabs of said third elongated walls are insertable through said first opening of said second elongated member, said fourth tabs of said fourth elongated walls are inserted through said fourth opening of said third elongated member partially defining said third corner and said fifth tabs of said fourth elongated wall are insertable through said second opening of said second elongated member, thereby defining a cabinet space within said two frame members, bottom walls and first, second, third, and fourth spacer members wherein said first, third, and fourth openings have dimensions that are slightly larger than any of said tabs.

2. The system set forth in claim 1 wherein said second and fifth openings have dimensions that are smaller than said tabs.

* * * * *